(12) United States Patent
Bonwick et al.

(10) Patent No.: US 7,526,622 B1
(45) Date of Patent: Apr. 28, 2009

(54) METHOD AND SYSTEM FOR DETECTING AND CORRECTING DATA ERRORS USING CHECKSUMS AND REPLICATION

(75) Inventors: Jeffrey S. Bonwick, Los Altos, CA (US); Matthew A. Ahrens, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 238 days.

(21) Appl. No.: 10/853,837

(22) Filed: May 26, 2004

(51) Int. Cl.
*G06F 12/16* (2006.01)

(52) U.S. Cl. .................... 711/162; 711/161; 714/6; 714/52

(58) Field of Classification Search ............. 711/161, 711/162; 714/6, 52
See application file for complete search history.

(56) References Cited

U.S. PATENT DOCUMENTS

| | | | |
|---|---|---|---|
| 4,144,522 | A | 3/1979 | Kageyama et al. |
| 5,129,085 | A | 7/1992 | Yamasaki et al. |
| 5,155,847 | A | 10/1992 | Kirouac et al. |
| 5,274,803 | A | 12/1993 | Dubin et al. |
| 5,371,885 | A | 12/1994 | Letwin |
| 5,403,639 | A | 4/1995 | Belsan et al. |
| 5,410,667 | A | 4/1995 | Belsan et al. |
| 5,675,802 | A | 10/1997 | Allen et al. |
| 5,819,292 | A | 10/1998 | Hitz et al. |
| 5,991,862 | A * | 11/1999 | Ruane ............. 711/202 |
| 6,012,063 | A | 1/2000 | Bodnar |
| 6,209,111 | B1 | 3/2001 | Kadyk et al. |
| 6,341,341 | B1 | 1/2002 | Grummon et al. |
| 6,536,033 | B1 | 3/2003 | Weerawarana et al. |
| 6,728,922 | B1 | 4/2004 | Sundaram et al. |
| 6,745,284 | B1 | 6/2004 | Lee et al. |
| 6,745,305 | B2 | 6/2004 | McDowell |
| 6,795,966 | B1 | 9/2004 | Lim et al. |
| 6,820,098 | B1 | 11/2004 | Ganesh et al. |
| 6,829,617 | B2 | 12/2004 | Sawdon et al. |
| 6,857,001 | B2 | 2/2005 | Hitz et al. |
| 6,892,211 | B2 | 5/2005 | Hitz et al. |
| 6,910,178 | B1 | 6/2005 | Kiselev et al. |
| 6,952,797 | B1 | 10/2005 | Kahn et al. |
| 7,007,196 | B2 | 2/2006 | Lee et al. |
| 7,032,154 | B2 | 4/2006 | Kidorf et al. |

(Continued)

OTHER PUBLICATIONS

Austin, B. "A Dynamic Disc Allocation Algorithm Designed to Reduce Fragmentation During Filing Reloading", Information Sciences Laboratory, Corporate Research and Development Center, General Electric Company, 4 pages, 1970.

(Continued)

*Primary Examiner*—Sanjiv Shah
*Assistant Examiner*—Jae U Yu
(74) *Attorney, Agent, or Firm*—Osha • Liang LLP

(57) ABSTRACT

A method for storing a data block, including storing the data block in a storage pool, storing a copy of the data block in the storage pool, obtaining a data block location, calculating a data block checksum for the data block, storing a first indirect block in the storage pool, wherein the first indirect block comprises the data block location and the data block checksum, and storing a copy of the first indirect block in the storage pool, wherein the copy of the first indirect block comprises a copy of the data block location and a copy of the data block checksum.

24 Claims, 7 Drawing Sheets

U.S. PATENT DOCUMENTS

| | | | |
|---|---|---|---|
| 7,039,661 | B1 | 5/2006 | Ranade et al. |
| 7,043,677 | B1* | 5/2006 | Li .............................. 714/758 |
| 7,133,964 | B2 | 11/2006 | Rodrigues et al. |
| 7,162,486 | B2 | 1/2007 | Patel et al. |
| 7,174,352 | B2 | 2/2007 | Kleiman et al. |
| 7,200,715 | B2 | 4/2007 | Kleiman et al. |
| 7,340,640 | B1 | 3/2008 | Karr et al. |
| 2002/0004883 | A1 | 1/2002 | Nguyen et al. |
| 2002/0055942 | A1* | 5/2002 | Reynolds .................... 707/200 |
| 2002/0087788 | A1* | 7/2002 | Morris ....................... 711/114 |
| 2002/0161972 | A1 | 10/2002 | Talagala et al. |
| 2003/0033477 | A1 | 2/2003 | Johnson et al. |
| 2003/0084242 | A1 | 5/2003 | Strange et al. |
| 2003/0126107 | A1* | 7/2003 | Yamagami ..................... 707/1 |
| 2003/0145167 | A1 | 7/2003 | Tomita |
| 2004/0024973 | A1 | 2/2004 | Chron et al. |
| 2004/0030822 | A1 | 2/2004 | Rajan et al. |
| 2004/0098720 | A1* | 5/2004 | Hooper ....................... 718/102 |
| 2004/0107314 | A1 | 6/2004 | Kim et al. |
| 2004/0123063 | A1 | 6/2004 | Dalal et al. |
| 2004/0143713 | A1 | 7/2004 | Niles et al. |
| 2004/0225834 | A1 | 11/2004 | Lu et al. |
| 2004/0234000 | A1 | 11/2004 | Page |
| 2004/0268068 | A1 | 12/2004 | Curran et al. |
| 2005/0010620 | A1 | 1/2005 | Silvers et al. |
| 2005/0097270 | A1 | 5/2005 | Kleiman et al. |
| 2005/0235154 | A1 | 10/2005 | Serret-Avila |
| 2006/0168409 | A1 | 7/2006 | Kahn et al. |
| 2006/0218644 | A1 | 9/2006 | Niles et al. |
| 2006/0256965 | A1 | 11/2006 | Rowe |

OTHER PUBLICATIONS

Goodheart, B., Cox, J. "The Magic Garden Explained", Prentice Hall, 8 pages, 1994.
Stallings, W. "Computer Organization and Architecture: Designing for Performance", Prentice Hall, 4 pages, 2000.
Sandberg, R. et al.; "Design and Implementation of the Sun Network Filesystem"; Sun Microsystems, Inc., 1985 USENIX Conference (12 pages).
McKusick, M. K. et al.; "A Fast File System for UNIX"; ACM Transaction on Computer Systems, vol. 2, No. 3, Aug. 1984, pp. 181-197 (17 pages).
Astrahan, M.M. et al.; "System R: Relational Approach to Database Management"; ACM Transactions on Database Systems, vol. 1, No. 2, Jun. 1976, pp. 97-137 (41 pages).
"Veritas File System 3.4 Administrator's Guide" Veritas Software Corporation, Nov. 2000, http://www.veritas.com; pp. 1-227 (227 pages).
Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).
Osorio, N. et al.; "Guidelines for Using Snapshot Storage Systems for Oracle Databases"; Oracle Corporation, Oct. 2001 (13 pages).
Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).
Sun StorEdge Instant Image 2.0 System Administrator's Guide; Sun Microsystems, Inc., Feb. 2000, Revision A (106 pages).
Ylonen, T.; "Concurrent Shadow Paging: A New Direction for Database Research"; Laboratory of Information Processing Science, Helsinki University of Technology, SF-02150, Espoo, Finland, 1992 (8 pages).
Popek, G. et al.; "The LOCUS Distributed System Architecture"; The MIT Press, Cambridge, Massachusetts, 1985 The Massachusetts Institute of Technology (8 pages).
Gray, J. et al.; "The Recovery Manager of the System R Database Manager"; Computing Surveys, vol. 13, No. 2, Jun. 1981 (20 pages).
Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am May 23, 1991 an der TU Berlin, and English Translation (245 pages).
Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).
"The Enterprise Challenge Served by Snapshot"; Whitepaper, 2001 LSI Logic Corporation (8 pages).
Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).
Suresh, Babu S.; "Persistent Snapshots"; Department of Computer Science and Automation, Indian Institute of Science, Bangalore—560 012, Jan. 2000 (38 pages).
"Proceedings of the 5th Annual Linux Showcase & Conference" USENIX Association, Oakland, California, Nov. 5-10, 2001 (11 pages).
Borg, A. et al.; "Fault Tolerance Under UNIX"; ACM Transactions on Computer Systems, vol. 7, No. 1, Feb. 1989, pp. 1-24 (24 pages).
Rosenblum, M. et al.; "The Design and Implementation of a Log-Structured File System"; Electrical Engineering and Computer Sciences, Computer Science Division, University of California, 1991 (15 pages).
Hecht, M. S. et al.; "Shadowed Management of Free Disk Pages with a Linked List", ACM Transactions on Database Systems, vol. 8, No. 4, Dec. 1983, pp. 503-514 (12 pages).
Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).
Lorie, R. A.; "Physical Integrity in a Large Segmented Database"; ACM Transactions on Database Systems, vol. 2, No. 1, Mar. 1977, pp. 91-104 (14 pages).
Johnson, J. E. et al.; "Overview of the Spiralog File System", Digital Technical Journal, vol. 8, No. 2, 1996, pp. 5-14 (10 pages).
Santry, D. S. et al.; "Deciding When to Forget in the Elephant File System"; 17th ACM Symposium on Operating Systems Principles (SOSP '99), Dec. 1999; pp. 110-123 (14 pages).
Chutani, S. et al., "The Episode File System"; Proceedings of the 1992 USENIX Winter Technical Conference; 1992; (18 pages).
Seltzer, M.L.; "File System Performance and Transaction Support"; University of California at Berkeley, 1992 (131 pages).
Octavian Lascu et al, "Configuration and Tuning GPFS for Digital Media Environments", Nov. 2005, IBM International Technical Support Organization, p. 38. Available online: http://www.redbooks.ibm/com/redbooks/pdfs/sg246700.pdf.
"An Introduction to GPFS v1.3 for Linux", Jun. 2003. Availale online: http://jumpdoc.fz-juelich.de/doc_pdf/gpfs21/GPFs-Linux-wp060303.pdf.
Sanjay Ghemawat et al, "The Google File System", 2003, ACM, p. 3.

* cited by examiner

METHOD AND SYSTEM FOR DETECTING AND CORRECTING DATA ERRORS USING CHECKSUMS AND REPLICATION

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk.

To access a file, the operating system (via the file system) typically provides file manipulation interfaces to open, close, read, and write the data within each file. More specifically, the file system stores data on the storage device by managing the allocation of space within the storage device. Typically, the volume manager provides space which is managed by the file system. Two common types of file system space allocation strategies are known as block-based allocation and extent-based allocation. Block-based allocation creates incremental disk space for each file each time the file is extended (i.e., modified via a write request to add information), whereas extent-based allocation creates a large series of contiguous blocks (i.e., extents) each time the file exhausts the space available in the file's last extent.

When allocating space, both block-based and extent-based allocations use space provided by the volume manager. The volume manager allows multiple physical disks to be used as a single volume (i.e., a virtual disk) to provide larger consolidated storage sizes and simpler management. The volume manager allows users to organize data along volume boundaries (i.e., each volume has physical disk space allocated to the volume such that the volume is tied only to that dedicated physical disk). The volume manager is typically implemented as a separate layer between the physical disks and the file system, and is presented to the user as a virtual disk device. In other words, volume managers organize the collections of physical devices (e.g., disks) into virtual devices. Additionally, the space allocated within the volume manager is handled by the file system. Consequently, the volume manager is not aware of which blocks within the available storage space are in use and which blocks are free for data to be stored.

Further, file systems may be mounted on the virtual disk devices. Thus, physical disks are partitioned and allocated to multiple virtual disk devices, and each virtual disk device is capable of having a file system that exclusively uses that particular virtual disk device. A request to access a file is typically performed by an application, via the file system, using a file name and logical offset. This file name and logical offset (i.e., the manner in which applications express file operation requests) corresponds to a location within the virtual disk device. Subsequently, the request is translated to physical disk space on the storage device by the volume manager, allowing the user of the application to access the data within a particular file.

File systems are generally susceptible to data corruption. Data corruption occurs in many forms. Some of the general forms of disk corruption that lead to data integrity issues include: bit rot, misdirected reads, phantom writes, misdirected writes, and user error. More specifically, bit rot describes a situation in which the data becomes corrupted because one or more bits within the data have become corrupted. Bit rot is typically a result of a media error (i.e., physical disk error, etc.). A misdirected read describes a situation in which the wrong portion of data is read from the physical disk. Similarly, a misdirected write corresponds to the situation in which the data is written to a wrong portion of the physical disk (i.e., the data was supposed to be written to location A on the physical disk is instead written to location B on the physical disk).

Further, a phantom write occurs after a write request has been issued to the physical disk and the data is not written to the physical disk, yet the process handling the write request indicates that the data has been written to the physical disk. In addition, to the above forms of disk corruption, data corruption may also be the result of a user error. For example, an administrator may accidentally write over a portion of the physical disk that is already in use.

File systems and/or volume managers may include a mechanism for determining whether the data stored within the file system has been corrupted or otherwise altered. One such mechanism is a checksum. The checksum corresponds to a set of bits obtained by applying a particular formula (e.g., Message Digest 5 (MD5), Fletcher, Cyclic Redundancy Check (CRC), etc.) to the piece of data. The checksum for the particular piece of data is then stored adjacent to the corresponding data in the file system (e.g., using 520 byte sectors). In addition, the system on which the file system is executing may include a mechanism to restore corrupted data. One such mechanism is mirroring. Mirroring corresponds to maintaining multiple copies of the file system across two or more physical disks. The mirrored copies of the file system may be used to restore the file system when a media failure occurs (i.e., the physical disk on which the file system resides fails) or when the file system becomes corrupted (as described above). The mirrored copy of the file system may be used to restore individual files or the entire file system.

SUMMARY

In general, in one aspect, the invention relates to a method for storing a data block, comprising storing the data block in a storage pool, storing a copy of the data block in the storage pool, obtaining a data block location, calculating a data block checksum for the data block, storing a first indirect block in the storage pool, wherein the first indirect block comprises the data block location and the data block checksum, and storing a copy of the first indirect block in the storage pool, wherein the copy of the first indirect block comprises a copy of the data block location and a copy of the data block checksum.

In general, in one aspect, the invention relates to a method for retrieving data in a data block, comprising obtaining an indirect block comprising a stored checksum and a data block location, obtaining the data block using the data block location, calculating the checksum for the data block to obtain a calculated checksum, retrieving the data from the data block, if the stored checksum equals the calculated checksum, and obtaining a copy of the data block, if the stored checksum is not equal to the calculated checksum.

In general, in one aspect, the invention relates to a system, comprising a storage pool comprising a data block, a first indirect block, a copy of the data block, and a copy of the first indirect block, wherein the first indirect block comprises a data block checksum and a data block location, and wherein the copy of the first indirect block comprises a copy of the data block checksum and copy of the a data block location, and a storage pool allocator configured to store the data block, the first indirect block, the copy of the data block, and the copy of the first indirect block in the storage pool.

In general, in one aspect, the invention relates to a computer system for retrieving data in a data block, comprising a processor, a memory, a storage device, and software instructions stored in the memory for enabling the computer system under control of the processor, to obtain an indirect block comprising a stored checksum and a data block location, obtain the data block using the data block location, calculate the checksum for the data block to obtain a calculated checksum, retrieve the data from the data block, if the stored checksum equals the calculated checksum, and obtain a copy of the data block, if the stored checksum is not equal to the calculated checksum.

In general, in one aspect, the invention relates to a network system having a plurality of nodes, comprising a storage pool comprising a data block, a first indirect block, a copy of the data block, and a copy of the first indirect block, wherein the first indirect block comprises a data block checksum and a data block location, and wherein the copy of the first indirect block comprises a copy of the data block checksum and copy of the data block location, and a storage pool allocator configured to store the data block, the first indirect block, the copy of the data block, and the copy of the first indirect block in the storage pool, and configured to replace the data block with the copy of the data block if a data error is discovered in the data block, wherein the storage pool is located on any one of the plurality of nodes, and wherein the storage pool allocator is located on any one of the plurality of nodes.

Other aspects of the invention will be apparent from the following description and the appended claims.

DETAILED DESCRIPTION

Figure 1:
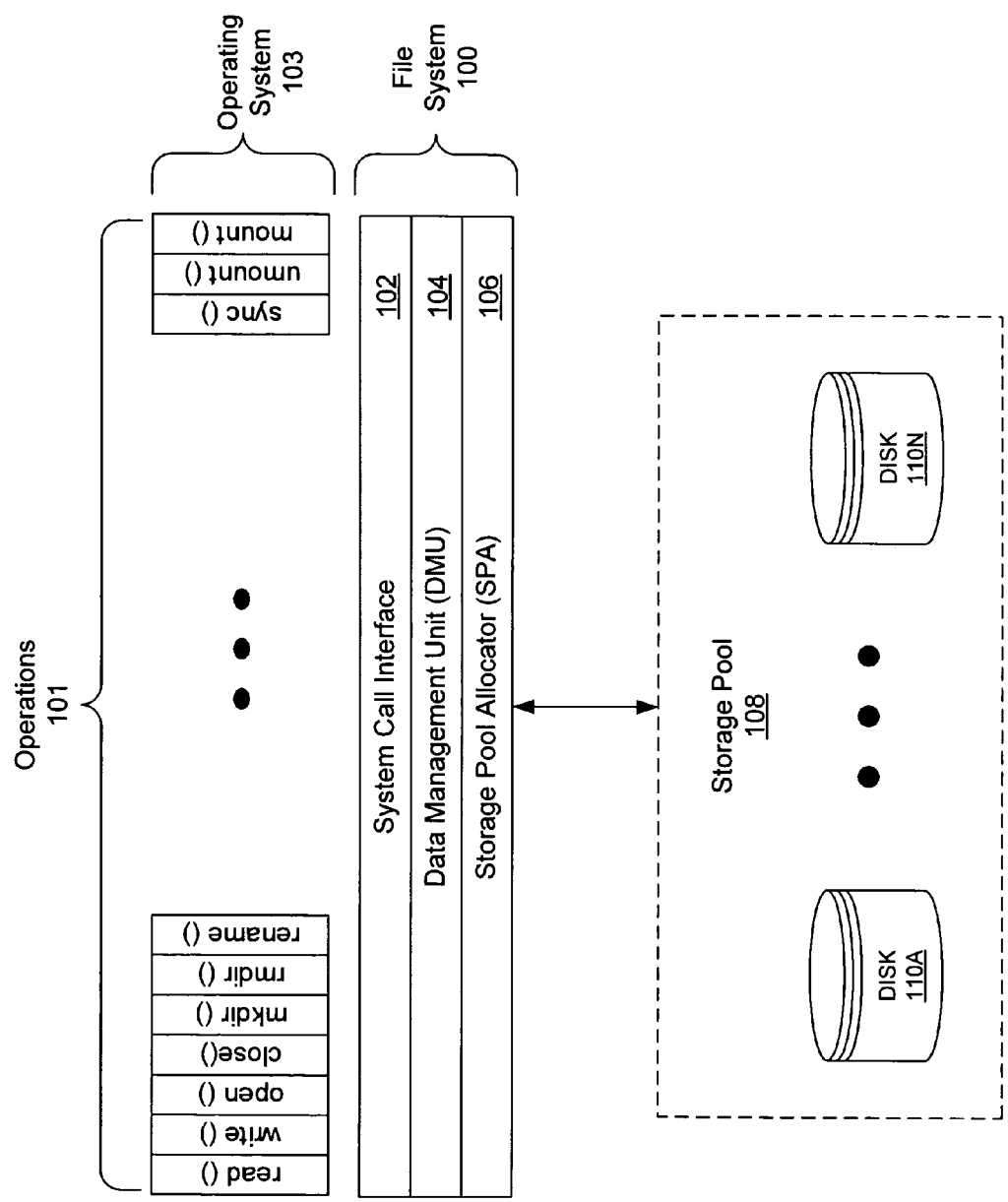
FIG. 1 shows a system architecture in accordance with an embodiment of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method and apparatus for detecting and repairing corrupted data within a file system. More specifically, embodiments of the invention provide a method and apparatus to detect and repair data corruption at the block level. Further, embodiments of the invention provide a method and apparatus to repair data without requiring any user interaction.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103), correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into I/O requests allowing related blocks to be forwarded to the SPA (106) together.

Further, in one embodiment of the invention, the DMU (104) includes functionality to determine whether a particular block (i.e., data block or indirect block, described below), is corrupted. In one embodiment of the invention, the DMU (104) uses a checksum mechanism to determine whether a particular block is corrupted. Further, the DMU (104) may include functionality to repair the corrupted data. In one embodiment of the invention, the DMU (104) includes functionality to search for an uncorrupted copy of the corrupted block. Further, the DMU (104) may include functionality to repair the corrupted block using the uncorrupted copy of the corrupted block.

The SPA (106) receives I/O requests from the DMU (106) and subsequently writes the blocks into the storage pool (108). The operation of the SPA (106) is described in FIG. 2 below. In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106). In one embodiment of the invention, the storage pool (108) includes one or more mirrors (i.e., copies of the file system). The mirrors may be located on separate physical disks, different portions of the same physical disk, or intermingled across one or more physical disks.

Figure 2:
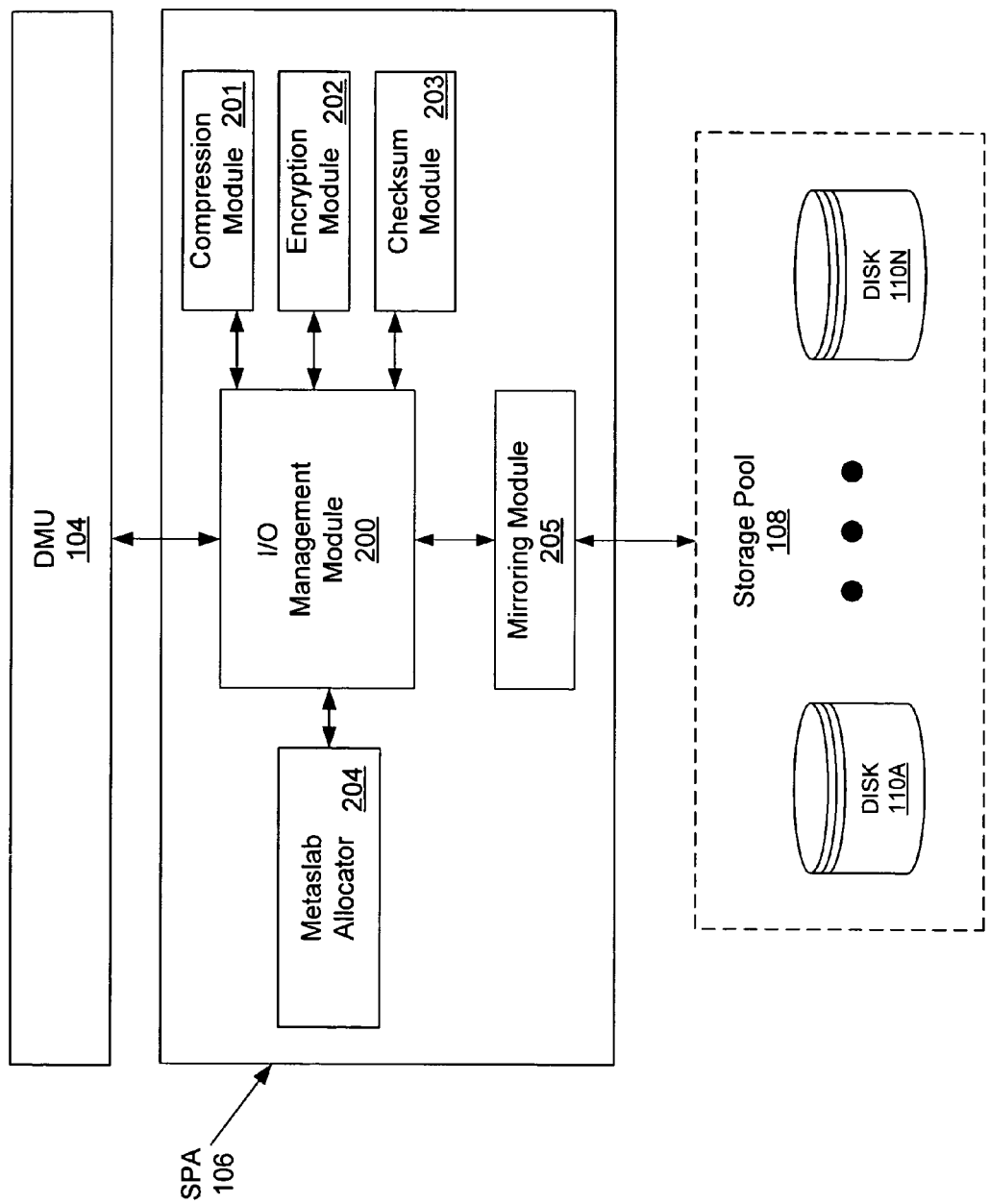
FIG. 2 shows a storage pool allocator in accordance with an embodiment of the invention.

FIG. 2 shows the SPA (106) in accordance with one embodiment of the invention. The SPA (106) may include an I/O management module (200), a mirroring module (205), a compression module (201), an encryption module (202), a checksum module (203), and a metaslab allocator (204). Each of these aforementioned modules is described in detail below.

As noted above, the SPA (106) receives transactions from the DMU (104). More specifically, the I/O management module (200), within the SPA (106), receives I/O requests from the DMU (104) and groups the I/O requests into I/O transaction groups in accordance with one embodiment of the invention. The I/O requests are subsequently forwarded from the I/O management module (200) to the mirroring module (205). In one embodiment of the invention, the mirroring module (205) includes functionality to perform the I/O requests provided by the I/O management module (200). More specifically, the mirroring module (205) may include functionality to obtain a single block (i.e., a data block or an indirect block) from the I/O management module (200) and store the block and a copy of the block in the storage pool (108). Further, in one embodiment of the invention, the block is stored on a first physical disk (i.e., on a first mirror) within the storage pool (108) and the copy of the block is stored on a second physical disk (i.e., on a second mirror) in the storage pool (108). In one embodiment of the invention, the block and the copy of the block are stored in the same location on the respective mirrors (the first mirror, and the second mirror, respectively). In one embodiment of the invention, the DMU (104) does not need to request that the blocks (i.e., data blocks and indirect blocks) are mirrored.

The compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool (108) is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks.

The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator (204) may include a policy that specifies a method to allocate segments.

Figure 3:
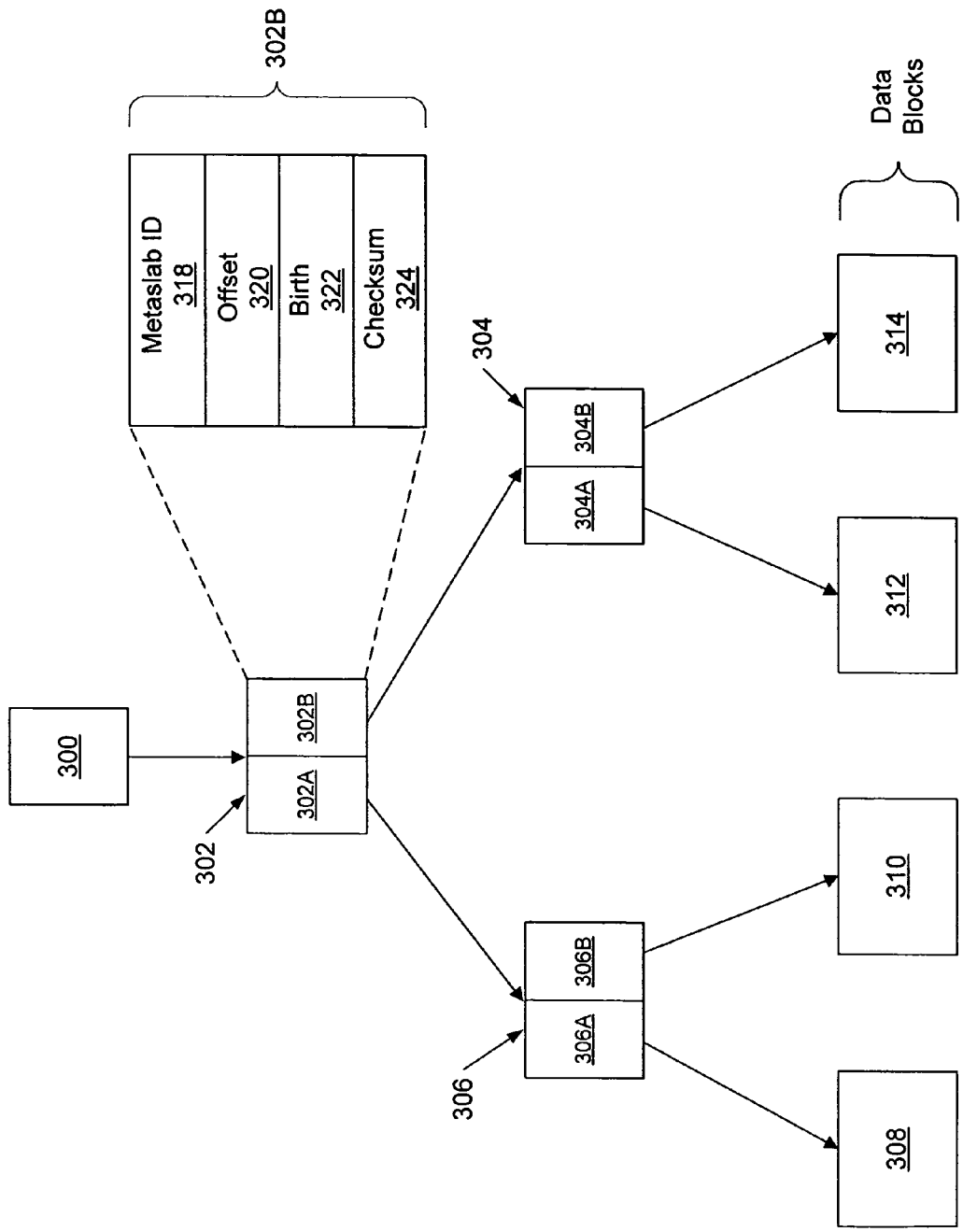
FIG. 3 shows a hierarchical data configuration in accordance with an embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool (108 in FIG. 1) in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool (108 in FIG. 1).

The root block (300) typically points to subsequent indirect blocks (302, 304, and 306). In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool (108 in FIG. 1). One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather data blocks contain actual data of files within the file system.

In one embodiment of the invention, each block pointer includes a metaslab ID (318), an offset (320) within the metaslab, a birth value (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and the location in the disk where the metaslab begins.

The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file.

Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool.

Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Figure 4:
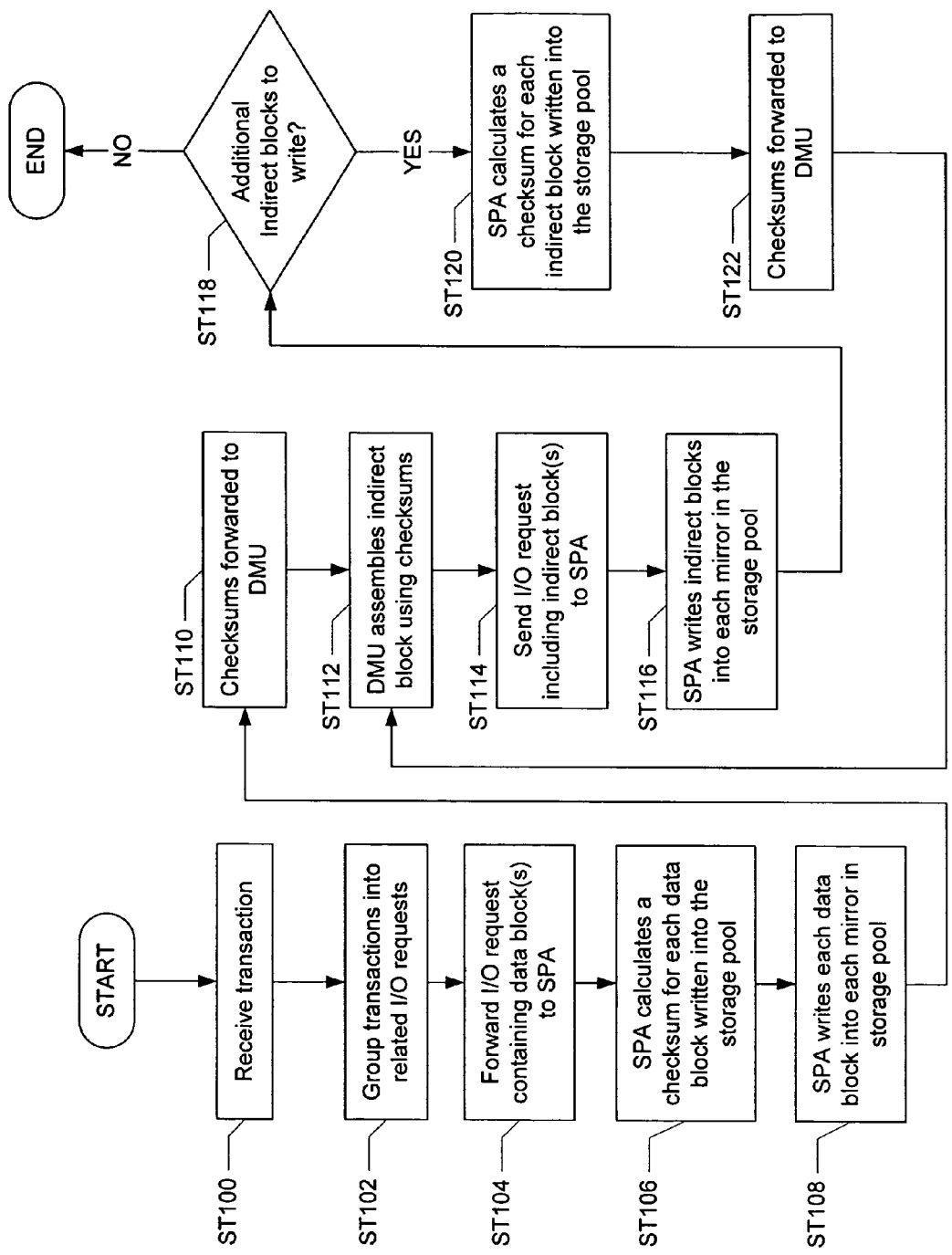
FIG. 4 shows a flow chart in accordance with an embodiment of the invention.

Using the infrastructure shown in FIGS. 1-3, the following discussion describes a method for detecting and correcting corrupted data in a file system in accordance with one embodiment of the invention. FIG. 4 shows a flow chart in accordance with one embodiment of the invention. Initially, the DMU receives a transaction from an application, the operating system (or a subsystem therein), etc. (ST100). The DMU subsequently groups transactions into one or more I/O requests (ST102). The I/O requests are subsequently forwarded to the SPA (ST104).

In one embodiment of the invention, the transaction includes one or more data blocks, and/or one or more indirect blocks. As noted above, the file system is stored on disk using a hierarchical structure, including data blocks and indirect blocks. Thus, for a given set of transactions, the first I/O request includes the data blocks to be written to disk, while subsequent I/O requests include the corresponding indirect blocks containing one or more block pointers. Accordingly, the I/O request referenced in ST104 includes data blocks.

Continuing with the discussion of FIG. 4, the SPA, upon receiving the I/O request including data blocks from the DMU, calculates a checksum for each data block written into the storage pool (ST106) and writes each data block into each mirror in the storage pool (ST108). As noted above, the DMU does not need to request, or have any knowledge about, the mirroring that is occurring in the storage pool. In one embodiment, the checksum module (203 in FIG. 2) within the SPA is used to calculate the checksum for each data block written into the storage pool.

The checksums are subsequently forwarded to the DMU (ST110). The DMU then assembles the indirect blocks using the checksums (ST112). Specifically, the DMU places the checksum for a given data block in the appropriate block pointer within the indirect block (i.e., the parent indirect block of the data block). Next, the indirect blocks are sent to the SPA (ST114). Those skilled in the art will appreciate that the aforementioned indirect blocks correspond to the indirect blocks that directly point (via the block pointers) to the data blocks (as opposed to indirect blocks that point to other indirect blocks).

Next, the SPA receives and subsequently writes the indirect blocks into each mirror in the storage pool (ST116). A determination is then made whether additional indirect blocks exist to write into the storage pool (i.e., whether the last indirect block written to the storage pool corresponds to the root block) (ST118). If no additional indirect blocks exist, then the method is complete. However, if additional indirect blocks exist, then the SPA calculates the checksum from each of the indirect blocks written into the storage pool (ST120). The checksums for each of the indirect blocks are subsequently forwarded to the DMU (ST122). ST112 through ST122 are subsequently repeated until the root block is written into the storage pool.

Figure 5:
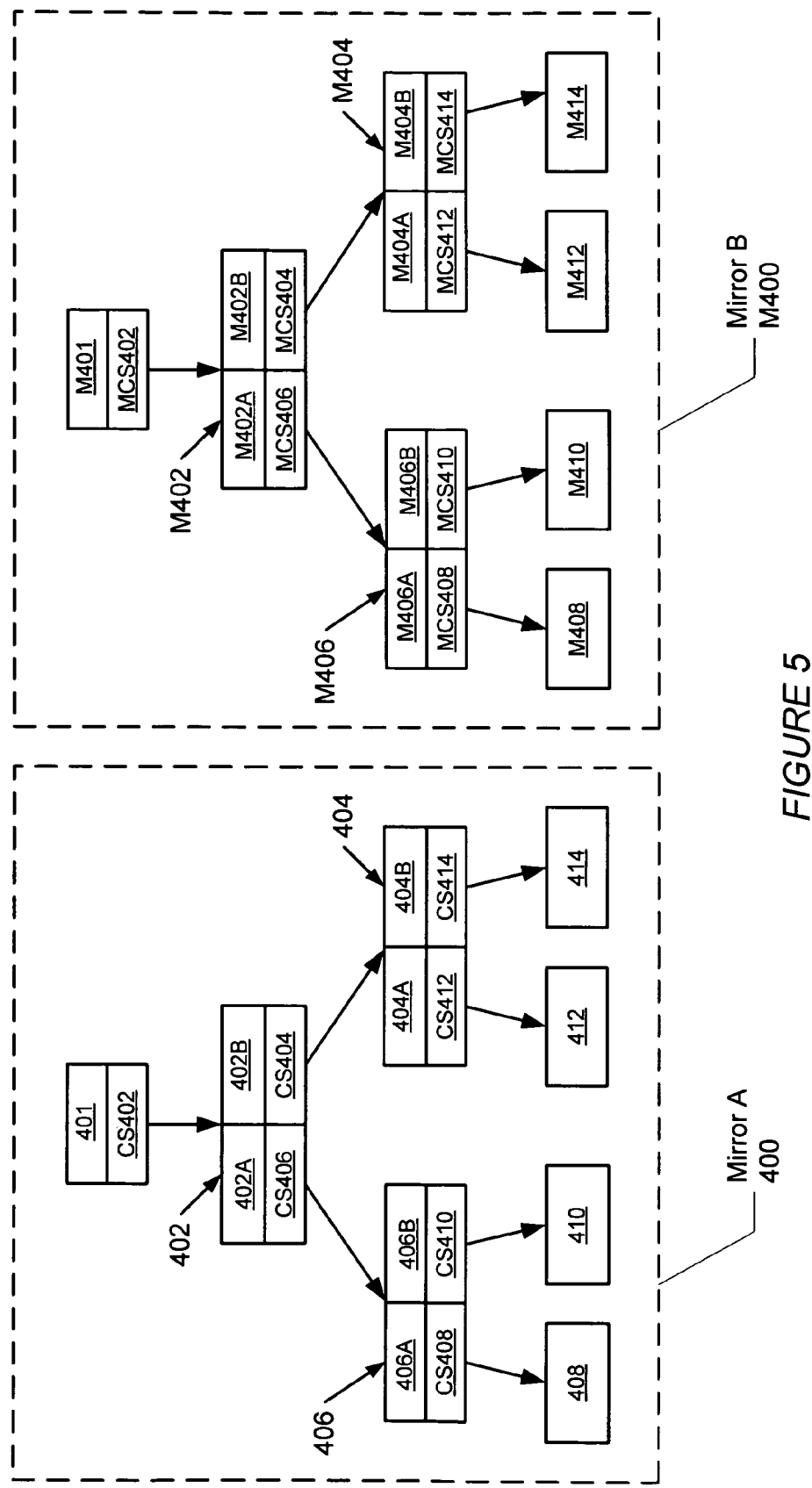
FIG. 5 shows a hierarchical data configuration in accordance with an embodiment of the invention.

FIG. 5 shows a hierarchical data configuration in accordance with an embodiment of the invention. Specifically, FIG. 5 shows a detailed view of the data blocks and indirect blocks resulting from using the method described in FIG. 4, in accordance with one embodiment of the invention. Specifically, the file system includes two mirrors: Mirror A (400) and Mirror B (M400). Mirror A (400) includes four data blocks (i.e., 408, 410, 412, and 414). Each data block (408, 410, 412, and 414) within the file system has a corresponding checksum (CS408, CS410, CS412, and CS414, respectively) stored in the corresponding block pointer (406A, 406B, 404A, 404B, respectively).

Each of the block pointers (406A, 406B, 404A, and 404B) is stored in an indirect block (i.e., 404, 406). Each indirect block (404, 406) also has a corresponding checksum (CS404, CS406, respectively) stored in a corresponding block pointer in a parent indirect block (402). Specifically, block pointer (402A) includes the checksum (CS406) for indirect block (406), and block pointer (402B) includes the checksum (CS404) for indirect block (404). In this particular example, the indirect block (402) is referenced by a root block (401). The root block (401) includes the checksum (CS402) for the indirect block (402).

Similarly, Mirror B (M400) includes four data blocks (i.e., M408, M410, M412, and M414). Each data block (M408, M410, M412, and M414) within the file system has a corresponding checksum (MCS408, MCS410, MCS412, and MCS414, respectively) stored in the corresponding block pointer (M406A, M406B, M404A, M404B, respectively). Each of the block pointers (M406A, M406B, M404A, and M404B) is stored in an indirect block (i.e., M404, M406). Each indirect block (M404, M406) also has a corresponding checksum (MCS404, MCS406, respectively) stored in a corresponding block pointer in a parent indirect block (M402). Specifically, block pointer (M402A) includes the checksum (MCS406) for indirect block (M406), and block pointer (M402B) includes the checksum (MCS404) for indirect block (M404). In this particular example, the indirect block (M402) is referenced by a root block (M401).

Figure 6:
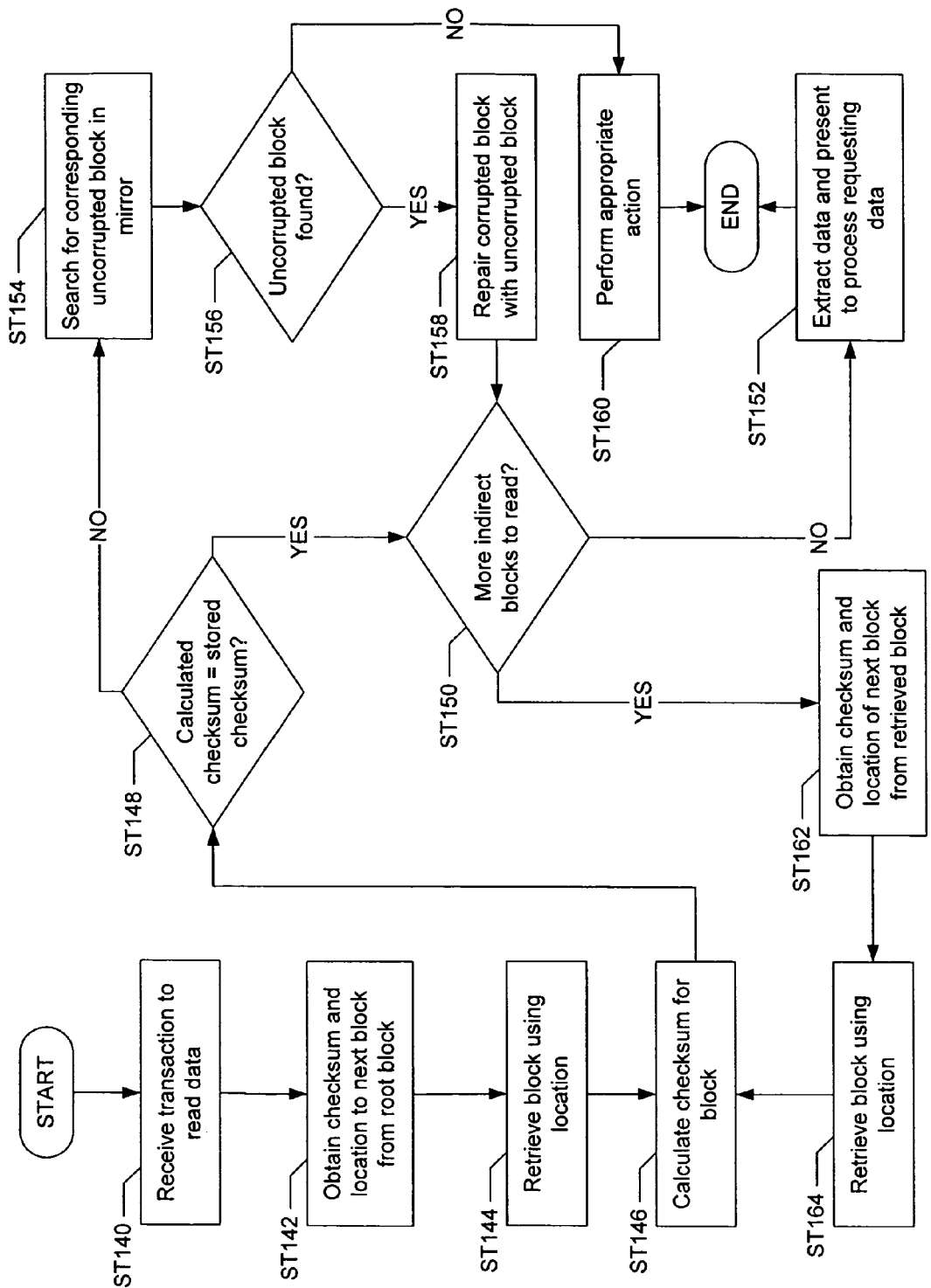
FIG. 6 shows a flow chart in accordance with an embodiment of the invention.

The root block (M401) includes the checksum (MCS402) for the indirect block (M402). FIG. 6 shows a flow chart in accordance with one embodiment of the invention. Initially, a transaction to read data is received (ST140). A checksum and a location to the next block (i.e., a data block or an indirect block) stored in the root block are subsequently retrieved (ST142). A virtual location (e.g., the metaslab ID and offset) is translated to a collection of physical locations, e.g., a disk ID and a disk offset for each mirror. One of these physical locations is subsequently used to obtain the block (i.e., the data block or the indirect block) (ST144). The checksum of the retrieved block is then calculated (ST146). A determination is subsequently made as to whether the stored checksum is equal to the calculated checksum (ST148). If the stored checksum is not equal to the calculated checksum (i.e., the block is corrupted), then an attempt is made to find an uncorrupted block from a different mirror (i.e., physical location) until all the mirrors are attempted (ST156).

In one embodiment of the invention, searching for an uncorrupted block includes using the physical locations obtained in ST142 to retrieve a potentially uncorrupted block from a mirror. Once a potentially uncorrupted block has been retrieved, a checksum is calculated for the potentially uncorrupted block. A determination is then made as to whether the checksum calculated for the potentially uncorrupted block is equal to the checksum retrieved in ST142. If the checksums are equal, then an uncorrupted block is found (ST156). Once the uncorrupted block is found, the uncorrupted block may be used to repair any corrupted blocks (ST158). In one embodiment of the invention, a copy of the uncorrupted block is written over the corrupted block. Once any corrupted blocks have been repaired, the method proceeds to ST150.

Alternatively, if the checksum for the potentially uncorrupted block is not equal to the checksum retrieved in ST142 (i.e., the potentially uncorrupted block is corrupted), the remaining mirrors are searched for uncorrupted blocks. If an uncorrupted block is not found after searching through all the mirrors (ST156), then an appropriate action is performed (e.g., an error message is generated indicating that the data is corrupted, etc.) (ST160).

If the stored checksum is equal to the calculated checksum, then a determination is made whether there are more indirect blocks to read (ST150). If there are no more data blocks to retrieve (i.e., the block is a data block), then the data is extracted from the data block and presented to the process requesting the data (ST162). Alternatively, if there are more indirect blocks to read, then the location of the next block (stored within a block pointer within the retrieved block) is obtained (ST164). The block (data block or indirect block) at the location is subsequently obtained (ST162). ST146 through ST164 are subsequently repeated until either a block containing corrupted data that can not be repaired is encountered (ST160) or the data block is encountered (ST152).

Figure 7:
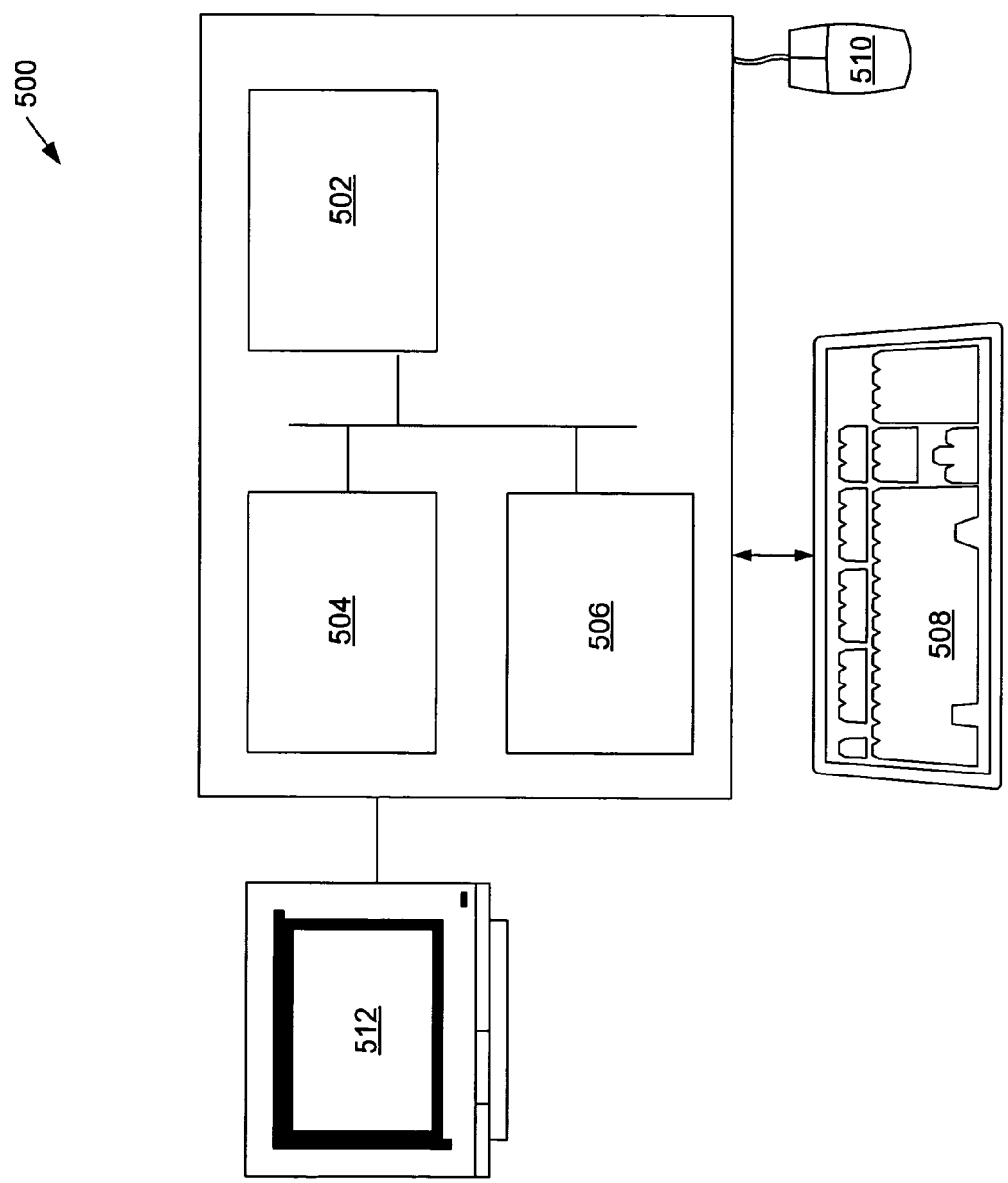
FIG. 7 shows a computer system in accordance with an embodiment of the invention.

The invention may be implemented on virtually any type of computer regardless of the platform being used. For example, as shown in FIG. 7, a networked computer system (500) includes a processor (502), associated memory (504), a storage device (506), and numerous other elements and functionalities typical of today's computers (not shown). The networked computer (500) may also include input means, such as a keyboard (508) and a mouse (510), and output means, such as a monitor (512). The networked computer system (500) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (500) may be located at a remote location and connected to the other elements over a network. Further, the invention may be implemented on a distributed system having a plurality of nodes, where each portion of the invention (e.g., the storage pool, the SPA, the DMU, etc.) may be located on a different node within the distributed system. In one embodiment of the invention, the node corresponds to a computer system. Alternatively, the node may correspond to a processor with associated physical memory.

Those skilled in the art will appreciate that while the invention has been described with respect to have simple mirroring mechanism (i.e., two mirrors), the invention may be extended to operate on any mirroring mechanism (e.g., RAID-1, etc.) with any number of mirrors.

One or more embodiments of the invention provide a method and apparatus to detected data corruption at the block level. Further, embodiments of the invention provide a method and apparatus to correct data corruption during a read request. Further, embodiments of the invention provide a method and apparatus to correct data corruption on the block level. In addition, embodiments of the invention provide a method and apparatus to correct data corruption with requiring any user interaction or knowledge.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for servicing a read request for a data block stored on a storage device, comprising:
   obtaining a first indirect block,
      wherein the first indirect block comprises an indirect block location of a second indirect block and a first indirect block checksum for the second indirect block,
      wherein the first indirect block and the second indirect block form a hierarchy for obtaining the data block, and
      wherein the second indirect comprises a data block location of the data block;
   calculating a second indirect block checksum for the second indirect block;
   determining that the second indirect block is corrupted when the first indirect block checksum does not equal the second indirect block checksum;
   retrieving data from the data block using a copy of the second indirect block when the second indirect block is corrupted; and
   repairing the second indirect block using the copy of the second indirect block when the second indirect block is corrupted.

2. A computer system, comprising:
   a processor;
   a memory;
   a storage device; and
   software instructions stored in the memory for enabling the computer system, under control of the processor, to:
      obtain a first indirect block,
         wherein the first indirect block comprises an indirect block location of a second indirect block and a first indirect block checksum for the second indirect block,
         wherein the first indirect block and the second indirect block form a hierarchy for obtaining the data block, and
         wherein the second indirect comprises a data block location of the data block;
      calculate a second indirect block checksum for the second indirect block;
      determine that the second indirect block is corrupted when the first indirect block checksum does not equal the second indirect block checksum;
      retrieve data from the data block using a copy of the second indirect block when the second indirect block is corrupted; and
      repair the second indirect block using the copy of the second indirect block when the second indirect block is corrupted.

3. The method of claim 1, further comprising:
   calculating a third indirect block checksum for the copy of the indirect block;
   determining that the copy of the second indirect block is corrupted when the third indirect block checksum does not equal the first indirect block checksum; and
   performing an appropriate action when the copy of the second indirect block is corrupted.

4. The method of claim 3, wherein performing the appropriate action comprises generating an error message.

5. The method of claim 1, wherein the second indirect block further comprises a first data block checksum for the data block, the method further comprising:
   calculating a second data block checksum for the data block;
   determining that the data block is corrupted when the first data block checksum does not equal the second data block checksum; and
   retrieving data from a copy of the data block when the data block is corrupted.

6. The method of claim 5, further comprising:
   repairing the data block using the copy of the data block when the data block is corrupted.

7. The method of claim 5, further comprising:
   calculating a third data block checksum for the copy of the data block;
   determining that the copy of the data block is corrupted when the third data block checksum does not equal the first data block checksum; and
   performing an appropriate action when the copy of the data block is corrupted.

8. The method of claim 7, wherein performing the appropriate action comprises generating an error message.

9. The method of claim 1, wherein the second indirect block is stored on a first storage device, the copy of the second indirect block is stored on a second storage device, and the second storage device is a mirror of the first storage device.

10. The computer system of claim 2, further comprising software instructions for enabling the computer system to:
    calculate a third indirect block checksum for the copy of the indirect block;
    determine that the copy of the second indirect block is corrupted when the third indirect block checksum does not equal the first indirect block checksum; and
    perform an appropriate action when the copy of the second indirect block is corrupted.

11. The computer system of claim 10, wherein software instructions to perform the appropriate action comprise software instructions to generate an error message.

12. The computer system of claim 2, wherein the second indirect block comprises further a first data block checksum for the data block, the computer system further comprising software instructions for enabling the computer system to:
    calculate a second data block checksum for the data block;
    determine that the data block is corrupted when the first data block checksum does not equal the second data block checksum; and
    retrieve data from a copy of the data block when the data block is corrupted.

13. The computer system of claim 12, further comprising software instructions for enabling the computer system to:
    repair the data block using the copy of the data block when the data block is corrupted.

14. The computer system of claim 12, further comprising software instructions for enabling the computer system to:
    calculate a third data block checksum for the copy of the data block;
    determine that the copy of the data block is corrupted when the third data block checksum does not equal the first data block checksum; and
    perform an appropriate action when the copy of the data block is corrupted.

15. The computer system of claim 14, wherein software instructions to perform the appropriate action comprise software instructions to generate an error message.

16. The computer system of claim 2, wherein the second indirect block is stored on a first storage device, the copy of the second indirect block is stored on a second storage device, and the second storage device is a mirror of the first storage device.

17. A system comprising:
    a storage pool comprising:
        a data block,
        a first indirect block,
        a second indirect block, and
        a copy of the second indirect block,
            wherein the first indirect block comprises an indirect block location of the second indirect block and a first indirect block checksum for the second indirect block,
            wherein the first indirect block and the second indirect block form a hierarchy for obtaining the data block, and
            wherein the second indirect comprises a data block location of the data block; and
    a file system configured to:
        obtain the first indirect block,
        calculate a second indirect block checksum for the second indirect block, determine that the second indirect block is corrupted when the first indirect block checksum does not equal the second indirect block checksum,
        retrieve data from the data block using the copy of the second indirect block when the second indirect block is corrupted, and
        repair the second indirect block using the copy of the second indirect block when the second indirect block is corrupted.

18. The system of claim 17, wherein the file system is further configured to:
    calculate a third indirect block checksum for the copy of the indirect block;
    determine that the copy of the second indirect block is corrupted when the third indirect block checksum does not equal the first indirect block checksum; and
    perform an appropriate action when the copy of the second indirect block is corrupted.

19. The computer system of claim 18, wherein the file system is configured to perform the appropriate action by generating an error message.

20. The system of claim 17,
    wherein the second indirect block further comprises a first data block checksum for the data block,
    wherein the storage pool further comprises a copy of the data block, and
    wherein the file system is further configured to:
        calculate a second data block checksum for the data block,
        determine that the data block is corrupted when the first data block checksum does not equal the second data block checksum, and
        retrieve data from a copy of the data block when the data block is corrupted.

21. The system of claim 20, wherein the file system is further configured to:
    repair the data block using the copy of the data block when the data block is corrupted.

22. The system of claim 20, wherein the file system is further configured to:
    calculate a third data block checksum for the copy of the data block;

determine that the copy of the data block is corrupted when the third data block checksum does not equal the first data block checksum; and perform an appropriate action when the copy of the data block is corrupted.

23. The system of claim 22, wherein the file system is configured to perform the appropriate action by generating an error message.

24. The system of claim 17, wherein the second indirect block is stored on a first storage device, the copy of the second indirect block is stored on a second storage device, and the second storage device is a mirror of the first storage device.

* * * * *